J. J. VOGEL.
CORKING MACHINE.
APPLICATION FILED JUNE 11, 1913.
1,105,115.
Patented July 28, 1914.
3 SHEETS—SHEET 1.
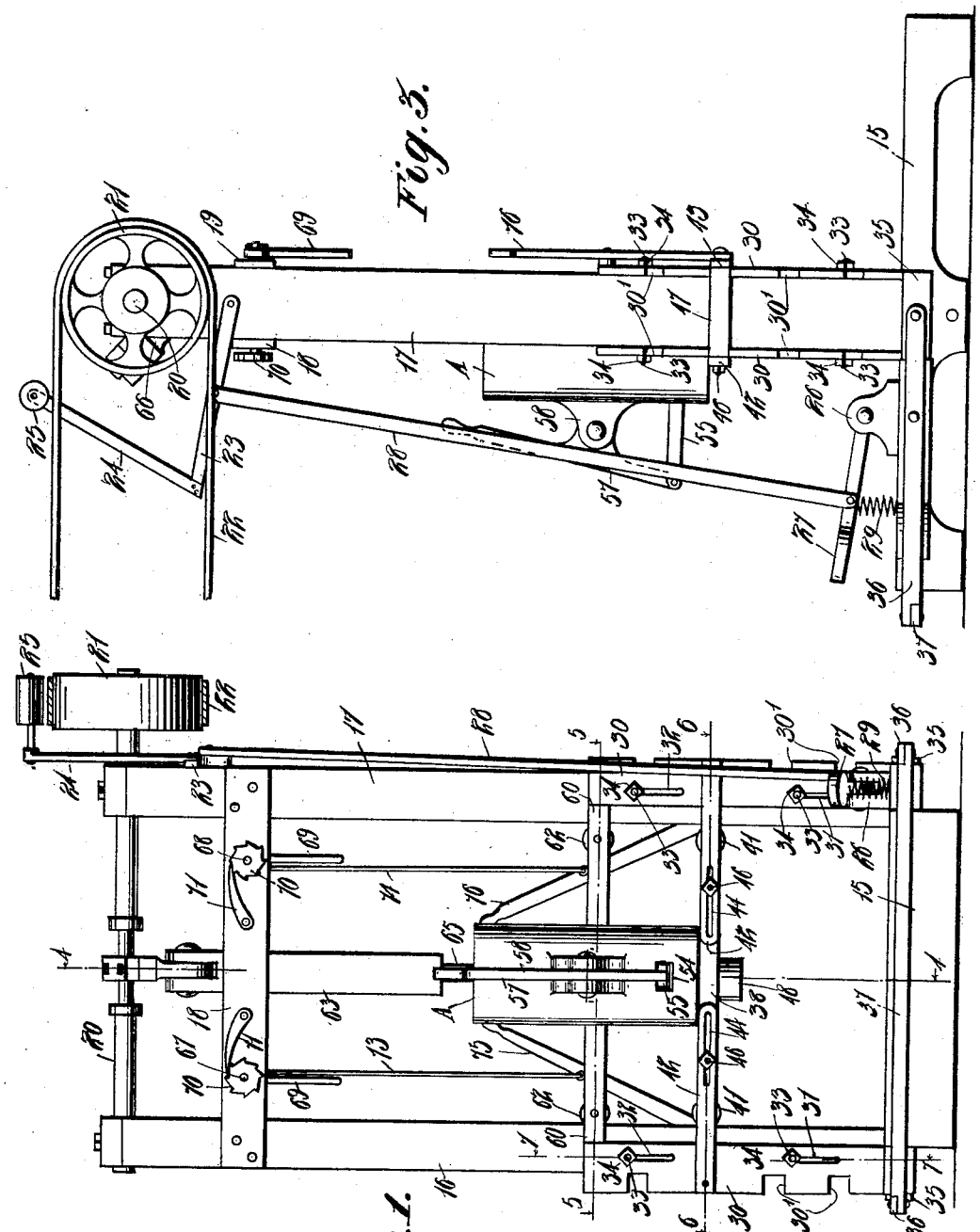
Witnesses
W. C. Fielding
Henry T. Bright
Inventor
J. J. Vogel,
By Chandler & Chandler
Attorneys

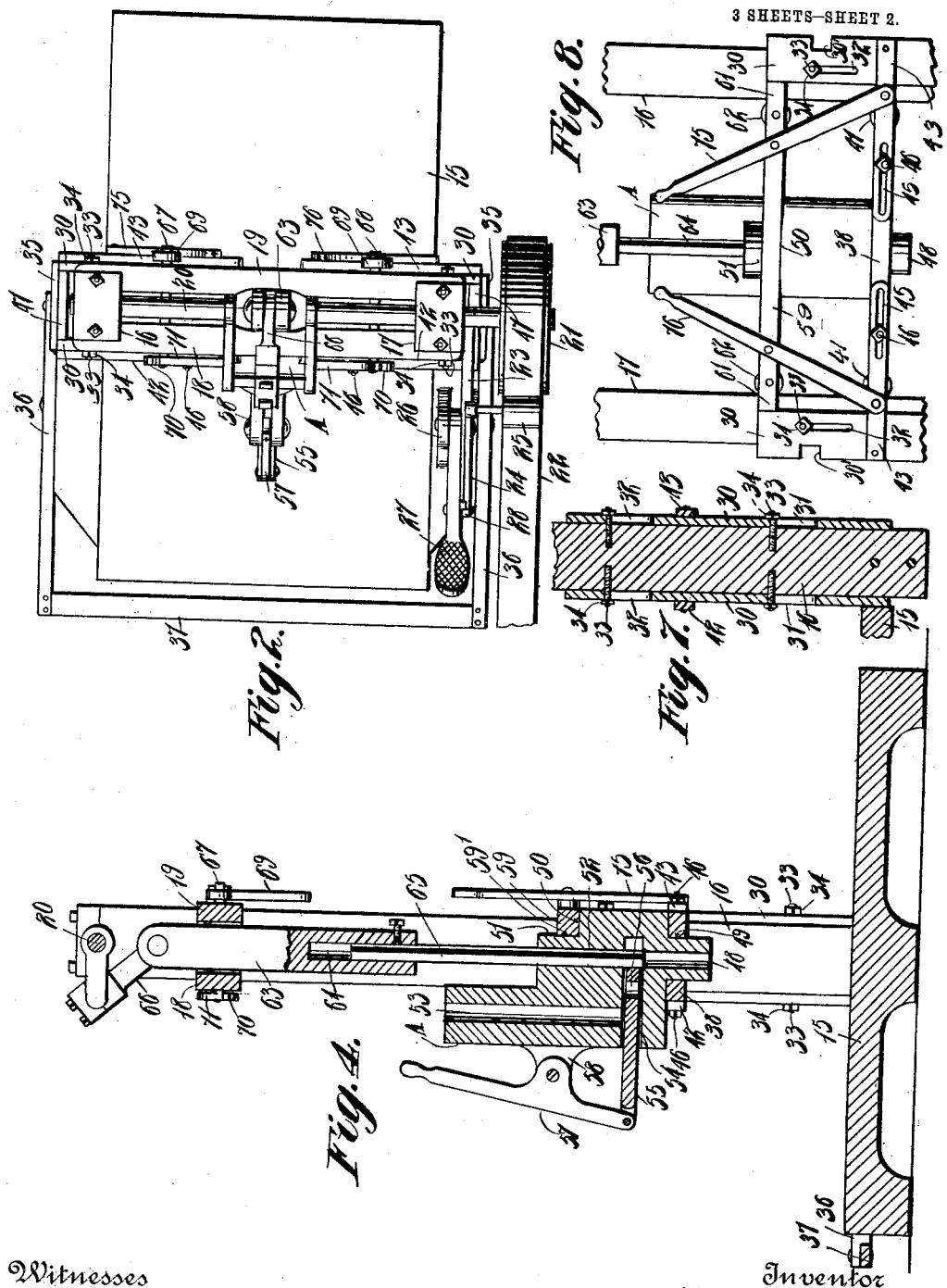

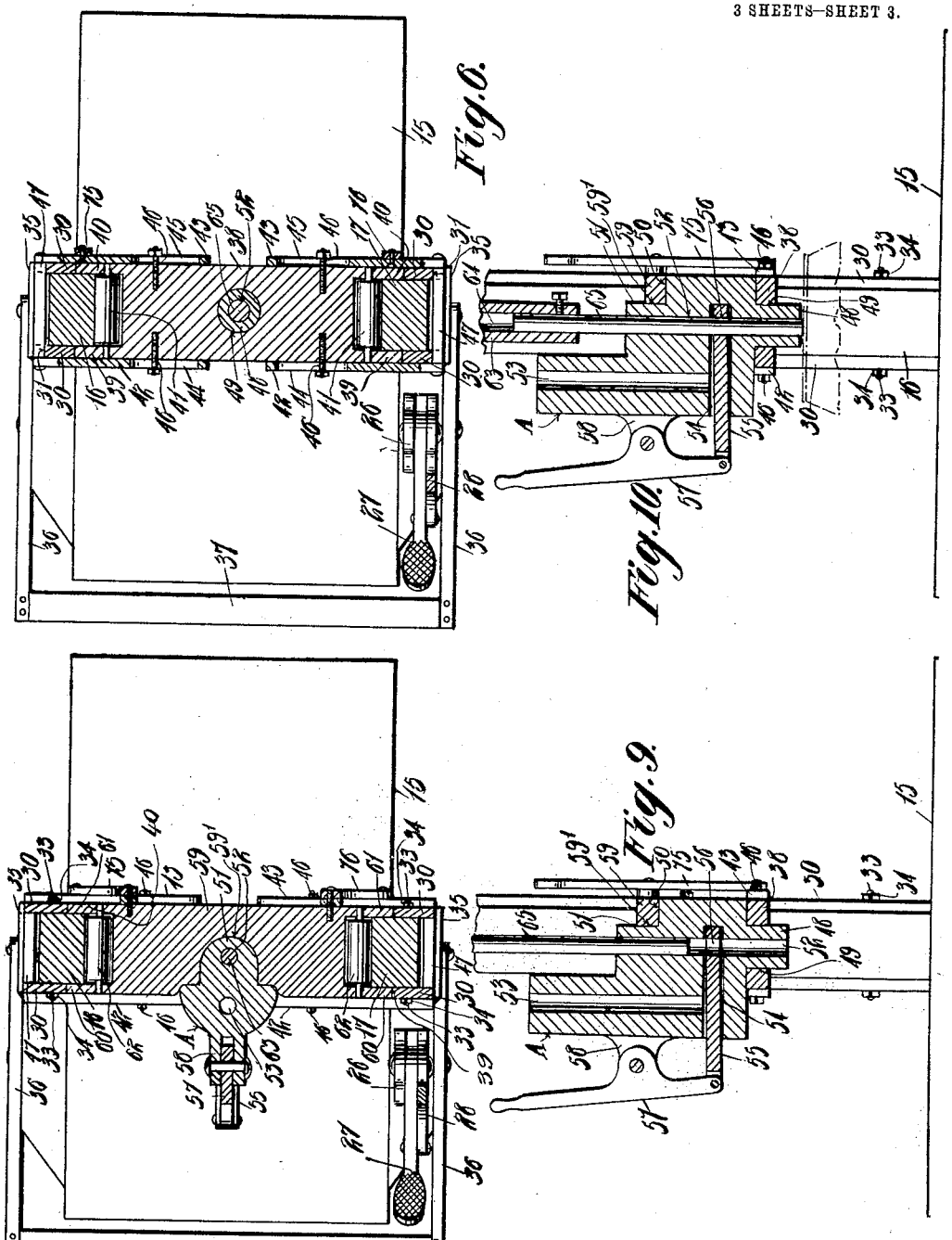

UNITED STATES PATENT OFFICE.

JOSEPH J. VOGEL, OF SPRINGFIELD, MINNESOTA.

CORKING-MACHINE.

1,105,115.   Specification of Letters Patent.   Patented July 28, 1914.

Application filed June 11, 1913.   Serial No. 773,121.

*To all whom it may concern:*

Be it known that I, JOSEPH J. VOGEL, a citizen of the United States, residing at Springfield, in the county of Brown, State of Minnesota, have invented certain new and useful Improvements in Corking-Machines; and I do hereby declare the following to be a full, clear, and exact description of the invention, such as will enable others skilled in the art to which it appertains to make and use the same.

This invention relates to corking machines and particularly to those employed in applying corks to barrels or kegs.

The object of the invention resides in the provision of a machine of the character named which may be operated by a single person to apply the corks with great rapidity and so as to insure proper setting of the corks in the barrels.

A further object of the invention resides in the provision of a machine of the type named which will be simple, economical and efficient.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views and in which—

Figure 1 is a front elevation of a corking machine constructed in accordance with the invention; Fig. 2, a plan view of same; Fig. 3, a side view; Fig. 4, a vertical section on the line 4—4 of Fig. 1; Fig. 5, a section on the line 5—5 of Fig. 1; Fig. 6, a section on the line 6—6 of Fig. 1; Fig. 7, a section on the line 7—7 of Fig. 1; Fig. 8, a partial rear elevation of the machine; Fig. 9, a view of a fragment of what is shown in Fig. 4 with the cork feeding mechanism operated to feeding position, and Fig. 10, a view of a fragment of what is shown in Fig. 4 with the parts in the position they would occupy just after the cork has been forced into a barrel.

Referring to the drawings the machine is shown as comprising a base 15 from which rises spaced uprights 16 and 17. These uprights 16 and 17 are connected together adjacent their upper ends by spaced beams 18 and 19. Journaled in suitable bearings mounted on the upper end of the uprights 16 and 17 is a crank shaft 20 which has fixed on the end thereof adjacent the upright 17 a belt wheel 21 whereby the machine may be connected with a suitable source of power by means of a belt 22 to effect the rotation of the shaft 20. Pivoted on the outer side of the upright 17 adjacent the upper end of said upright is an arm 23 and secured to the free end of this arm 23 is an arm 24 which extends upwardly and has journaled on the free end thereof a roller 25 positioned to engage the belt 22. Pivoted in a bracket 26 mounted on the base 15 is a pedal 27 which is connected to the arm 23 by means of a link 28. A spring 29 constantly tends to lift the free end of the pedal and thereby hold the roller 25 out of engagement with the belt 22. It will be noted that the belt 22 is very loose on the belt wheel 21 so that the movement of the belt will not under ordinary conditions rotate the shaft 20. However when the free end of the pedal 27 is depressed the roller 25 is moved downwardly so as to tighten the belt 22 on the belt wheel 21 and effect the desired rotation of the shaft 20. Disposed against the front and rear sides of the uprights 16 and 17 are corresponding plates 30 each of which is provided with notches 35 in its outer edge and vertical slots 31 and 32. Extending through the slots 31 and 32 of each plate 30 are pins 33 mounted respectively in the uprights 16 and 17. Each of the pins 33 has threaded on its outer end a nut 34 whereby the plates 30 are held against the front and rear sides of the uprights 16 and 17 and are capable of limited vertical movement. The lower ends of the plates 30 connected with the same upright are connected together by a bar 35 and pivotally connected to each bar 35 is one end of a lever 36. Each of the levers 36 is pivotally connected intermediate its ends to the base 15 and the ends of these levers 36 remote from the bars 35 are connected by a treadle bar 37. By this construction it will be apparent that upon pressing downwardly upon the treadle bar 37 the various plates 30 will be raised in unison.

Disposed between the uprights 16 and 17 is a platform 38 the ends of which are forked to form arms 39 and 40 disposed in embracing relation respectively to the uprights 16 and 17. Journaled between each pair of arms 39 and 40 are rollers 41 which are adapted to bear against the uprights 16 and 17 respectively. Disposed against the front and rear edges of the platform 38 at each end of the latter are plates 42 and 43 respectively provided with elongated slots 44 and 45 respectively. Mounted in the platform 38 and extending through respective slots 44 and 45 are set screws 46 whereby the plates 42 and 43 may be adjusted longitudinally of the platform 38. Connecting the outer ends of each pair of plates 42 and 43 is a bar 47 adapted to engage in corresponding notches 30' of the plates 30 which are associated with the same upright. By this construction it will be apparent that when the bars 47 are disposed in the notches 30' of the plates 30 and the set screws 46 locked the platform 38 can be elevated by depressing the treadle bar 37. It will also be apparent that by engaging the bars 47 in different notches 35 the relative position of the platform 38 with respect to the plates 30 may be altered. Supported upon the platform 38 is the cork feeding mechanism which comprises a block A having a reduced lower end 48 which extends through an opening 49 in the platform 38. This block A further includes stepped portions 50 and 51 through which extends a vertical passage 52, said passage 52 also passing through the reduced lower end 48. Formed in the block A forward of the passage 52 is a vertical recess 53 which opens through the extreme upper end of said block. The lower end of this recess 53 communicates with a transverse passage 54 which also intersects the passage 52. Slidable in the passage 54 is a plunger 55 provided with a cork receiving opening 56. The outer end of this plunger 55 is pivotally connected to the lower end of a lever 57, which latter is in turn pivoted on a bracket 58 mounted on the block A. By this construction it will be apparent that upon operating the lever 57 the opening 56 can be disposed in line with the recess 53 or in line with the passage 52. Mounted upon the top of the stepped portion 50 is a platform 59 provided with a recess 59' receiving the stepped portion 51 of the block A. The ends of the platform 59 are forked to form arms 60 and 61 which are disposed in embracing relation respectively to the uprights 16 and 17. Journaled between each pair of arms 60 and 61 is a roller 62 and these rollers are adapted to engage respectively the uprights 16 and 17. Slidably mounted between the beams 18 and 19 for vertical movement is a bar 63 the lower end of which is recessed as at 64 and adjustably mounted in said recess is a plunger 65 slidable in the passage 52 of the block A. Pivotally connected to the upper end of the bar 63 is an arm 66 which latter is in turn connected to the crank portion of the shaft 20 so that upon rotation of the shaft 20 the bar 63 and plunger 65 will be reciprocated. Rotatably mounted in the beams 18 and 19 are shafts 67 and 68 provided on corresponding ends with crank arms 69 respectively and on their other ends with ratchet wheels 70. Pivoted on the beam 18 are pawls 71 which coöperate with respective ratchet wheels 70 to lock the shafts 67 and 68 against rotation in one direction. Secured to the shafts 67 and 68 are the upper ends of flexible connections 73 and 74 respectively, the other ends of said connections being suitably secured to the platform 59. By rotating the shafts 67 and 68 it will be apparent that the connections 73 and 74 will be wound thereon and the platform 59, 38 and block A will be elevated, the bars 47 having been previously disengaged from the notches 30'. When these parts have been elevated sufficiently to meet required conditions the pawls 71 co-act with the ratchet wheel 70 to lock the shaft 67 and 68 against rotation so that the parts are supported at the desired elevation by the connections 73 and 74. After the parts just referred to have been raised to the desired elevation the bars 47 are engaged in desired notches 30' of the plates 30 so that a limited upward movement can still be imparted to the platforms 59, 38 and block A through the medium of the treadle bar 37.

In order to provide means for shifting the bars 47 into and out of the notches 30 there is pivoted on the rear edge of the platform 59 levers 75 and 76. The lower ends of these levers 75 and 76 are in turn pivotally connected with plates 43 so that upon operation of the levers the plates 43 will be moved longitudinally to force the bars 47 into and out of the notches 30'.

In the use of the machine the platforms 58 and 38 are first adjusted vertically according to the size of the barrel to be operated upon. The corks are then inserted in the recess 53 one upon the other with the opening 56 disposed in line with the recess 53. The treadle bar 37 is then depressed and the platforms 58 and 38 slightly elevated. The barrel to be corked is then moved beneath the platform 38 with the opening therein which is to receive the cork disposed in line with the plunger 65 and passage 52. The treadle bar 37 is then released and the platforms 59 and 38 will move downwardly so as to dispose the reduced end 48 of the block A upon the upper end of the barrel. The lever 57 is then operated to move the plunger 65 inwardly and dispose the opening 56 in line with the passage 52. As this opening 56 has already received the lowermost cork and is slightly larger in diameter than said cork the latter will fall into the passage 52. The pedal 27 is then depressed which will effect the rotation of the shaft 20 to force the plunger 65 downwardly to drive the cork into the opening in the barrel. The plunger 65 is then elevated and the operation just described repeated.

What I claim is:—

1. In a corking machine, the combination of a base, a pair of uprights secured to said base, plates disposed against corresponding opposite sides of the uprights, a bar connecting the outer edges of the plates associated with respective uprights, said plates being provided respectively with vertical slots, pins mounted in the uprights and engaged through said slots respectively, nuts threaded on the outer ends of said pins whereby the plates are slidably secured to the uprights, levers pivoted on opposite sides of the base respectively and having one end pivotally connected to said bars, a treadle bar connecting the outer ends of said levers whereby the depression of the treadle bar will simultaneously elevate said plates, a platform slidably mounted between the uprights and adjustably connected to said plates whereby the elevation of the latter will elevate said platform, a cork magazine and feeding device supported by said platform, a plunger for forcing corks delivered by the feeding device from the magazine into the cork receiving opening of a receptacle, and means for reciprocating said plunger.

2. In a corking machine, the combination of a base, a pair of uprights secured to said base, plates mounted on corresponding opposite sides of the uprights for vertical movement, and having their outer edges correspondingly notched, means for simultaneously elevating said plates, a platform slidably mounted between the uprights, plates longitudinally adjustable on opposite edges of the platform at each end of the latter, a bar connecting the free ends of the plates at the same end of the platform and adapted to be engaged in and removed from the notches in the vertically movable plates mounted on the uprights whereby said platform is supported by and adjustable relatively to the vertical movable plates, a cork magazine and feeding device supported by said platform, a plunger for forcing corks delivered by the feeding device from the magazine into the cork receiving opening of a receptacle, and means for reciprocating said plunger.

3. In a corking machine, the combination of a base, a pair of uprights secured to said base, plates mounted on corresponding opposite sides of the uprights for vertical movement, means for moving said plates vertically in unison, said plates having their outer edges correspondingly notched, a platform slidably mounted between the uprights, plates longitudinally adjustable on opposite edges of the platform at each end of the latter, a bar connecting the free ends of the plates at the same end of the platform adapted to be engaged in and removed from the notches in the vertically movable plates mounted on the uprights whereby said platform is supported by and adjustable relatively to the vertical movable plates, means for supporting said platform during the removal and engagement of said bars from and in the notches of the vertical movable plates, a cork magazine and feeding device supported by said platform, a plunger for forcing corks delivered by the feeding device from the magazine into the cork receiving opening of a receptacle, and means for reciprocating said plunger.

In testimony whereof, I affix my signature, in the presence of two witnesses.

JOSEPH J. VOGEL.

Witnesses:
FRANK LANG,
WENZEL VOGEL.

Copies of this patent may be obtained for five cents each, by addressing the "Commissioner of Patents, Washington, D. C."